United States Patent [19]

Ebato et al.

[11] Patent Number: 4,661,415

[45] Date of Patent: Apr. 28, 1987

[54] HYDROGEN ABSORBING ZIRCONIUM ALLOY

[75] Inventors: Kazuo Ebato, Yokohama; Yasuaki Osumi, Atsugi; Keiji Tamura, Kawasaki; Hiroshi Yoshida, Ichikawa, all of Japan

[73] Assignee: Nihon Yakin Kogyo Kabushiki Kaisha, Tokyo, Japan

[21] Appl. No.: 790,190

[22] Filed: Oct. 22, 1985

[30] Foreign Application Priority Data

Oct. 27, 1984 [JP] Japan ................... 59-225103

[51] Int. Cl.$^4$ .................. C01B 6/00; B22F 1/02
[52] U.S. Cl. ................... 428/570; 420/583; 420/900; 423/648 R
[58] Field of Search ........ 420/900, 417, 421, 422, 420/583, 5; 75/126 E, 126 F, 126 D; 423/644 R, 648 R; 428/570

[56] References Cited

U.S. PATENT DOCUMENTS 4,163,666 8/1979 Shaltiel et al. .............. 420/900
4,489,049 12/1984 Forester et al. ............. 423/644

FOREIGN PATENT DOCUMENTS 15928 9/1980 European Pat. Off. .
56-99083 6/1981 Japan .

OTHER PUBLICATIONS

Jacob et al, "Hydrogen Absorption in $(Zr_xTi_{1-x})B_2$ (B≡Cr, Mn) and the Phenomenological Model for the Absorption Capacity in Pseudo Binary Laves Phase Compounds, J. Less Comm Metal 73 (1980) pp. 369–376.

Pick et al, "Enhancement of Hydrogen Uptake Rates for Nb and Ta by Thin Surface Overlayers. Journal of the Less-Common Metals—Racah Institute of Physics—D. Shaltiel—pp. 329-338.

Primary Examiner—Christopher W. Brody
Attorney, Agent, or Firm—Balogh, Genova, Dvorak, Kramer, & Traub

[57] ABSTRACT

A zirconium alloy having a plateau region of equilibrium hydrogen dissociation pressure and a small hysteresis, whose hydrogen dissociation pressure is in a range of 0.6 to 3 atm at 20° C., 1 to 5 atm at 40° C., and 1 to 17 atm at 80° C., the activation of which can be effected according to a single procedure of vacuum evacuation at room temperature and pressurization under a hydrogen pressure of 30 atm at room temperature, and which is comparable or superior in the rates of hydrogen absorption and release, the maximum hydrogen absorbing capacity and effective hydrogen releasing capacity to conventional zirconium alloys. A hydrogen absorbing and releasing material comprising an alloy as mentioned above and thin films of one element selected from Pd, Cu, and Ni, which allows only hydrogen to permeate, and covering the surfaces of particles of the alloy.

3 Claims, 3 Drawing Figures

HYDROGEN ABSORBING ZIRCONIUM ALLOY

The present invention relates to a hydrogen absorbing alloy. Particularly this invention relates to a hydrogen absorbing zirconium alloy.

PRIOR ART

Hydrogen is an abundantly occurring element in an aspect of material resources. Combustion of hydrogen merely forms water, and hence it does not lead to destruction of an ecological balance. Moreover, storage and transportation of hydrogen are easy. In view of these, hydrogen is expected to play a principal role as a secondary energy in the clean energy system in future.

However, hydrogen is gaseous at normal temperatures and has an extremely low liquefaction temperature. Therefore, development of a technique of storing hydrogen has heretofore been a big problem to be solved. As one system for solving the above-mentioned problem, a system of storing hydrogen in the form of a metal hydride has been attracting attention. According to this system, hydrogen in a weight corresponding to the capacity of a commercially available hydrogen cylinder of 150 atmospheres can be stored in a volume of at most 20% of the capacity of the cylinder, or a given weight of hydrogen can be stored in a volume of at most 80% of the volume occupied by the same weight of liquid hydrogen. Furthermore, the system is very favorable in safety and easiness in handling.

A hydrogen absorbing alloy is a material suitable for absorbing hydrogen in the form of a metal hydride and releasing the absorbed hydrogen. Generation or absorption of the heat of reaction being accompanied with formation or decomposition of a metal hydride occurs during the course of absorption of hydrogen into the alloy or release of the absorbed hydrogen from the alloy. Utilizing the above-mentioned heat of reaction, development of application systems such as a regenerator, a heat pump, or a thermal energy-mechanical energy conversion device may be possible.

The following properties are required of the hydrogen absorbing material:

(1) inexpensive, and abundant in resources, (2) high in capacity of absorbing hydrogen, (3) adequate in equilibrium pressure of hydrogen absorption and release at service temperatures, and small in hysteresis as a difference between the absorption pressure and the release pressure, (4) reversible in the reaction of hydrogen absorption and release or dissociation with a high reaction rate, (5) high in stability against impurities such as moisture or oxygen, low in the liability to pulverization of the alloy material, and excellent in durability, and (6) high in effective thermal conductivity.

$ZrV_2$ among known binary hydrogen absorbing alloys is an alloy having a high hydrogen absorbing capacity, an easiness in activation (a procedure of removing hydrogenation suppressing substances, such as an oxide film, adsorbed gases, or adherent water, present on the surface of an alloy), a small hysteresis, a high rate of hydrogenation reaction, and a high stability against gaseous impurities. However, since this alloy has an equilibrium hydrogen dissociation pressure of $10^{-8}$ atm at normal temperatures, it forms an extremely stable hydride, $ZrV_2H_{4.8}$, which requires a temperature of at least several hundred degrees and a degree of vacuum of $10^{-5}$ atm for releasing absorbed hydrogen therefrom. Besides, the price of the alloy is as high as just below that of $LaNi_5$, which is known to be an expensive alloy. Laves phasic pseudo-binary compounds, $Zr(Fe_{1-k}V_k)_2$, produced with a view to increasing the equilibrium hydrogen pressure while keeping the characteristics of the $ZrV_2$ alloy as well as lowering the cost are revealed in Journal of the Less-Common Metals, 73, 329-338 (1980). However, even $Zr(Fe_{0.75}V_{0.25})_2$ having especially excellent properties in this alloy system has an equilibrium hydrogen dissociation pressure of the order of 0.1 atm even at 40° C., and lacks in a plateau region (a comparatively flat portion, where the equilibrium hydrogen pressure does not change so much even if the ratio of the number of hydrogen atoms to that of alloy atoms is changed, is generally called a plateau region in a P-C-T diagram showing a relationship between the equilibrium hydrogen pressure and the above-mentioned ratio at various temperatures). Accordingly, the above-mentioned $Zr(Fe_{1-k}V_k)_2$ alloys are defective in that they cannot be efficiently employed in actual hydrogen storage, heat regeneration, etc.

Among conventional hydrogen absorbing alloys, for example, $TiFe_{0.9}Mn_{0.1}$ alloy developed with a view to facilitating the activation does not have a plateau region in the dissociation pressure, or has an extremely lowered dissociation pressure, thus presenting a problem. Japanese Patent Laid-Open No. 1032/1983 discloses a method for solving these problems. This method comprises coating the surface of a known hydrogen absorbing alloy with an element whose oxide is relatively easy to reduce in a hydrogen atmosphere, and examples of which include Ni, Cu and Co. For example, in the case of a TiFe alloy, it has conventionally been required for effecting the activation to pressurize the alloy under a hydrogen pressure of 30 to 60 $Kg/cm^2$ at a high temperature of 450° to 500° C., or to repeat the procedure of evacuation for about one week. By contrast, according to the above-mentioned method, the activation is effected under a hydrogen pressure of b 20 to 30 $Kg/cm^2$ at a temperature of 200° C. or lower only in a day. Thus the performance of the method is an improvement in aspects of treatment temperature, hydrogen pressure, necessary treatment time, etc. As described above, a hydrogen absorbing metal material obtained by the above-mentioned method is easy to activate, and has a suitable equilibrium hydrogen pressure as the hydrogen absorbing and releasing material. However, it is insufficient in such requirements that the hydrogen absorbing and releasing material have a high stability against impurities such as moisture or oxygen, a low liability to pulverization of the alloy material, and an excellent durability. Therefore, there remains practical problems that the capacity of hydrogen absorption of the material is decreased by poisoning of the material with moisture, oxygen, etc., and that the hysteresis is large.

It is therefore an object of this invention to provide an inexpensive alloy having a plateau region, an equilibrium hydrogen dissociation pressure of at least about 1 atm in a temperature range of from normal temperatures to 100° C., and other superior characteristics to those of the $Zr(Fe_{1-k}V_k)_2$ alloys, which is an improvement over the above-mentioned $Zr(Fe_{1-k}V_k)_2$ alloys having no plateau region and a low equilibrium hydrogen dissociation pressure by eliminating these defects thereof.

Another object of this invention is to provide a hydrogen absorbing and releasing material not subject to poisoning with gaseous impurites, which is prepared by subjecting the surface of the alloy of this invention as described above to a coating treatment.

SUMMARY OF THE INVENTION

The alloy of the present invention is a multi-component hydrogen absorbing zirconium alloy represented by the following rational formula of atomic composition: $Zr_xA_y(Fe_{1-k}V_kCr_m)_2$, wherein A is at least one element selected from the group consisting of Ti, Nb and Mo, $0.4 \leq x \leq 1.0$, $0 \leq y \leq 0.6$, $k = l + m$, $0.2 \leq k \leq 0.3$, and $m > 0$ when $y = 0$.

The hydrogen absorbing and releasing material of this invention is one which can be prepared by coating the surfaces of particles of the alloy of this invention with thin films of one element selected from the group consisting of Pd, Cu and Ni, and having an excellent poisoning resistance against gaseous impurities.

DETAILED DESCRIPTION OF THE INVENTION

Figure 1:
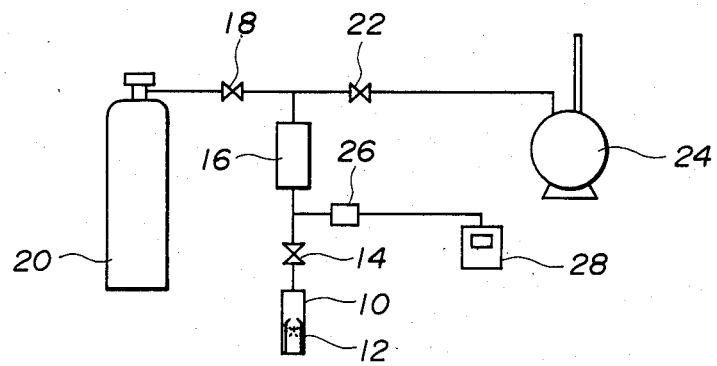
FIG. 1 is an illustration of methods of activating and measuring the amount of hydrogen absorption or release of the alloy of this invention.

The inventors of the present invention have studied variation of characteristics of the hydrogen absorbing alloy with substitution of at least one element selected from among Ti, Nb and Mo for part of Zr of the above-mentioned known alloy, $Zr(Fe_{1-k}V_k)_2$, or addition of at least one element selected from among Ti, Nb and Mo to the alloy, $Zr(Fe_{1-k}V_k)_2$, and substitution of Cr for part of Fe and/or V. Quite contrary to their expectation, a plateau region has been realized with a plateau pressure of about 1 to 20 atm in a range of room temperature to 100° C. An alloy formed by the above procedure has a sharply increased effective amount of hydrogen release and increased rates of hydrogen absorption and release, and keeps conventionally favorable levels of maximum amount of hydrogen absorption, hysteresis and easiness in activation. Besides, a lower cost has been realized. The present invention has been completed based on these findings.

In the alloy of this invention, x and y must be 0.4 or more and 0.6 or less, respectively, since the amount of hydrogen absorption lowers, and the intermetallic compound phase ($\beta$ phase) and the plateau region disappear with an increased hysteresis in a P-C-T characteristic diagram when x is less than 0.4 or when y is more than 0.6. As k decreases below 0.2, the amount of hydrogen absorption abruptly decreases. When k is above 0.3, the plateau region disappears and the equilibrium hydrogen dissociation pressure abruptly decreases. Thus k must be in a range: $0.2 \leq k \leq 0.3$.

The hydrogen absorbing and releasing material of this invention is a material comprising alloy particles of this invention whose surfaces are coated with a thin film of one element selected from among Pd, Cu, Ni, which selectively allows hydrogen to permeate therethrough. The material of this invention is not subject to poisoning of the alloy by moisture, oxygen, etc., and has a small hysteresis. This is because a metal, Pd, Cu or Ni, constituting the thin film allows only hydrogen molecules to dissociate into an atomic state, and hence, to permeate into the inside thereof but does not allow other gaseous impurities to be adsorbed on the surface of the alloy and to permeate into the inside of the alloy. When a hydrogen gas containing 1,000 ppm of moisture is used, a material of TiFe taken as an example of the conventional hydrogen absorbing alloys and plated over the surface thereof with Ni has at 40° C. a hydrogen absorbing capacity of as low as 0.7 wt. %, a hydrogen absorbing pressure of about 15 atm, a hydrogen releasing pressure of about 7 atm and a large hysteresis of about 8 atm. Thus, when the TiFe material is plated with Ni, the hydrogen absorbing capacity thereof is greatly decreased as compared with that of the alloy itself (1.0 wt %) without Ni plated while the hysteresis is increased. When the hysteresis is large, a hydrogen absorbing alloy or a metal hydride thereof must be heated or cooled by a larger temperature difference, or pressurized with hydrogen or evacuated by a larger pressure difference for effecting the absorption or release of hydrogen. For this reason, the capacity of hydrogen storage or the heat of hydrogenation cannot be effectively utilized.

In contrast, the hydrogen absorbing or releasing material of the present invention is a novel material developed for the first time, which has all properties required of the hydrogen absorbing and releasing material, and which is largely improved, especially, in hydrogen absorbing capacity and hysteresis as compared with conventional hydrogen absorbing and releasing materials. Therefore, the capacity of hydrogen storage as the hydrogen absorbing and releasing material and the heat of reaction accompanying the absorption or release of hydrogen can be effectively utilized. Furthermore, the material of this invention is easy to activate in the hydrogen absorption and release reactions, and has a very high reaction rate. Moreover, the material is not deteriorated even if the absorption and release of hydrogen containing gaseous impurities such as moisture or oxygen are repeated. In addition, the material has an improved thermal conductivity.

The process for preparing the alloy of the present invention will now be described. The known process of preparing a hydrogen absorbing zirconium alloy may be adopted for preparing the alloy of this invention. However, adoption of the arc melting process is most preferred. The process for preparing the alloy of this invention according to the arc melting process will now be described. Zr, Fe, V, Cr, Ti, Nb and Mo are each weighted and mixed, followed by pressing into an arbitrary form. The pressed body is placed in an arc melting furnace and molten in an inert atmosphere, followed by consolidation and cooling thereof to normal temperature in the furnace. The resulting alloy is picked out of the furnace, and put into a container capable of being evacuated to vacuum. In order to homogenize the alloy, it is kept at 1,000° to 1,100° C. in an atmosphere having a high degree of vacuum of $10^{-2}$ Torr or less for 8 hours again in the furnace. Thereafter, the homogenized alloy is cooled either by putting the same into water or by taking out it from the container and allowing it to be spontaneously cooled. Subsequently, it is broken into particules for expanding the surface area of the alloy to enhance the hydrogen absorbing capacity.

The process for producing the hydrogen absorbing and releasing material of this invention will now be described.

After the alloy of this invention as described above is pulverized into particles of about 100 μm in size, thin films having about 100 to 1000 Å thickness of one element selected from Pd, Cu and Ni are formed on the surface of particles by electroless plating, vacuum deposition, or electrolytic plating. The formation of the thin films does not spoil the hydrogen absorbing capacity of the alloy itself, and allows the first performed activation treatment for facilitating hydrogen absorption to be effected under substantially the same conditions as in the case of the alloy not plated with the thin metal films. The thin metal films formed have interatomic spaces enough to allow hydrogen atoms to permeate therethrough. Thus no substantial decrease in the hydrogen absorption rate is observed.

The following examples will further illustrate the present invention.

EXAMPLE 1

Commercially available Zr, Fe, Cr, Ti, Nb, Mo, Ni (each having a purity of 99.9% or more), V(purity: 99.7%), Al(purity: 99.4%), and a rare earth element alloy (hereinafter referred to as "Mm", purity: 98.7%) were weighed. They were placed in copper crucibles in a high-vacuum arc melting furnace. After the furnace was purged with 99.99% Ar, they were molten at about 2,000° C. About 40 g each of nine kinds of samples Nos. 1 to 7, 14 and 15 as shown in Table 1 were prepared. Here, Mm was composed of 28.2% of La, 50.2% of Ce, 15.4% of Nd, 4.8% of Pr, 0.1% of Sm, 0.8% of Fe, 0.3% of Mg, and 0.2% of Al.

TABLE 1

| Sample No. | Alloy composition (ratio of the number of atoms) | Heat treatment for homogenization | | | Activation | |
|---|---|---|---|---|---|---|
| | | Temperature (°C.) | Time (hr) | Cooling method | Evacuation temperature (°C.) | Number of times |
| Alloy materials according to this invention | | | | | | |
| 1. | $Zr_{0.8}Ti_{0.2}(Fe_{0.75}V_{0.15}Cr_{0.1})_2$ | 1100 | 8 | Water cooling | 40 | 1 |
| 2. | $Zr_{0.7}Ti_{0.2}Nb_{0.1}(Fe_{0.75}V_{0.15}Cr_{0.1})_2$ | 1100 | 8 | Water cooling | 40 | 1 |
| 3. | $Zr_{0.8}Ti_{0.05}Nb_{0.15}(Fe_{0.75}V_{0.15}Cr_{0.1})_2$ | 1100 | 8 | Water cooling | 40 | 1 |
| 4. | $Zr_{0.8}Nb_{0.2}(Fe_{0.75}V_{0.25})_2$ | 1100 | 8 | Water cooling | 40 | 1 |
| 5. | $Zr_{0.8}Mo_{0.2}(Fe_{0.75}V_{0.25})_2$ | 1100 | 8 | Water cooling | 40 | 1 |
| 6. | $Zr_{0.8}Ti_{0.1}Mo_{0.1}(Fe_{0.75}V_{0.15}Cr_{0.1})_2$ | 1100 | 8 | Water cooling | 40 | 1 |
| 7. | $Zr_{0.8}Ti_{0.2}(Fe_{0.75}V_{0.25})_2$ | 1100 | 8 | Water cooling | 40 | 1 |
| 8. | $Zr_{0.8}Ti_{0.2}(Fe_{0.75}V_{0.15}Cr_{0.1})_2$ | 1100 | 15 | Water cooling | 80 | 1 |
| 9. | $Zr_{0.8}Ti_{0.2}(Fe_{0.7}V_{0.2}Cr_{0.1})_2$ | 1100 | 15 | Water cooling | 80 | 1 |
| 10. | $Zr_{0.7}Ti_{0.2}Nb_{0.1}(Fe_{0.75}V_{0.15}Cr_{0.1})_2$ | 1100 | 15 | Water cooling | 80 | 1 |
| 11. | $Zr_{0.8}Ti_{0.2}(Fe_{0.75}V_{0.25})_2$ | 1100 | 15 | Water cooling | 80 | 1 |
| 12. | $Zr_{0.8}Ti_{0.2}(Fe_{0.75}V_{0.15}Cr_{0.1})_2$ | 1100 | 15 | Water cooling | 80 | 1 |
| 13. | $Zr_{0.7}Ti_{0.2}Nb_{0.1}(Fe_{0.75}V_{0.15}Cr_{0.1})_2$ | 1100 | 15 | Water cooling | 80 | 1 |
| Comparative | | | | | | |
| 14. | $Zr(Fe_{0.75}V_{0.25})_2$ | 1100 | 8 | Water cooling | 40 | 1 |
| 15. | $MmNi_{4.5}Al_{0.5}$ | 1100 | 8 | Water cooling | 40 | 1 |
| 16. | $Zr(Fe_{0.75}V_{0.25})_2$ | 1100 | 15 | Water cooling | 80 | 1 |

| Sample No. | Alloy composition (ratio of the number of atoms) | Temperature (°C.) | Hydrogen absorption and release | | |
|---|---|---|---|---|---|
| | | | Equilibrium hydrogen dissociation pressure[1](atom) | Maximum hydrogen absorbing capacity[2] $Ml_2/g.M.$ | Effective hydrogen releasing capacity[3] $mlH_2/g.M.$ |
| Alloy materials according to this invention | | | | | |
| 1. | $Zr_{0.8}Ti_{0.2}(Fe_{0.75}V_{0.15}Cr_{0.1})_2$ | 40 | 1.5 | 146 | 116 |
| 2. | $Zr_{0.7}Ti_{0.2}Nb_{0.1}(Fe_{0.75}V_{0.15}Cr_{0.1})_2$ | 40 | 4.9 | 126 | 107 |
| 3. | $Zr_{0.8}Ti_{0.05}Nb_{0.15}(Fe_{0.75}V_{0.15}Cr_{0.1})_2$ | 40 | 2.1 | 141 | 107 |
| 4. | $Zr_{0.8}Nb_{0.2}(Fe_{0.75}V_{0.25})_2$ | 40 | 1.0 | 134 | 70 |
| 5. | $Zr_{0.8}Mo_{0.2}(Fe_{0.75}V_{0.25})_2$ | 40 | 1.9 | 120 | 98 |
| 6. | $Zr_{0.8}Ti_{0.1}Mo_{0.1}(Fe_{0.75}V_{0.15}Cr_{0.1})_2$ | 40 | 2.2 | 112 | 89 |
| 7. | $Zr_{0.8}Ti_{0.2}(Fe_{0.75}V_{0.25})_2$ | 40 | 2.9 | 126 | 89 |
| 8. | $Zr_{0.8}Ti_{0.2}(Fe_{0.75}V_{0.15}Cr_{0.1})_2$ | 80 | 6.7 | 126 | 110 |
| 9. | $Zr_{0.8}Ti_{0.2}(Fe_{0.7}V_{0.2}Cr_{0.1})_2$ | 80 | 1.4 | 142 | 84 |
| 10. | $Zr_{0.7}Ti_{0.2}Nb_{0.1}(Fe_{0.75}V_{0.15}Cr_{0.1})_2$ | 80 | 16.5 | 104[6] | 90[6] |
| 11. | $Zr_{0.8}Ti_{0.2}(Fe_{0.75}V_{0.25})_2$ | 80 | 1.7 | 120 | 80 |
| 12. | $Zr_{0.8}Ti_{0.2}(Fe_{0.75}V_{0.15}Cr_{0.1})_2$ | 20 | 0.62 | 150 | 104 |
| 13. | $Zr_{0.7}Ti_{0.2}Nb_{0.1}(Fe_{0.75}V_{0.15}Cr_{0.1})_2$ | 20 | 2.9 | 152 | 131 |
| Comparative | | | | | |
| 14. | $Zr(Fe_{0.75}V_{0.25})_2$ | 40 | 0.16 | 156 | 29 |
| 15. | $MmNi_{4.5}Al_{0.5}$ | 40 | 4.8 | 128 | 106 |
| 16. | $Zr(Fe_{0.75}V_{0.25})_2$ | 80 | 0.5 | 128 | 53 |

| Sample No. | Alloy composition (ratio of the number of atoms) | Hydrogen absorption and release | | |
|---|---|---|---|---|
| | | Hydrogen absorption rate $mlH_2/g.M.$ min. | Inclination of plateau[4] d(ln Pd)/d(H/M) | Hysteresis factor[5] $ln(P_2/P_1)$ |
| Alloy materials according to this invention | | | | |
| 1. | $Zr_{0.8}Ti_{0.2}(Fe_{0.75}V_{0.15}Cr_{0.1})_2$ | 51 | 1.5 | 0.13 |
| 2. | $Zr_{0.7}Ti_{0.2}Nb_{0.1}(Fe_{0.75}V_{0.15}Cr_{0.1})_2$ | 53 | 1.2 | 0.13 |
| 3. | $Zr_{0.8}Ti_{0.05}Nb_{0.15}(Fe_{0.75}V_{0.15}Cr_{0.1})_2$ | 45 | 2.7 | 0.28 |
| 4. | $Zr_{0.8}Nb_{0.2}(Fe_{0.75}V_{0.25})_2$ | 50 | 2.9 | 0.14 |
| 5. | $Zr_{0.8}Mo_{0.2}(Fe_{0.75}V_{0.25})_2$ | 38 | 3.3 | 0.15 |
| 6. | $Zr_{0.8}Ti_{0.1}Mo_{0.1}(Fe_{0.75}V_{0.15}Cr_{0.1})_2$ | 51 | 2.6 | 0.23 |
| 7. | $Zr_{0.8}Ti_{0.2}(Fe_{0.75}V_{0.25})_2$ | 54 | 5.0 | 0.38 |

TABLE 1-continued

| | | | | |
|---|---|---|---|---|
| 8. | $Zr_{0.8}Ti_{0.2}(Fe_{0.75}V_{0.15}Cr_{0.1})_2$ | 40 | 1.1 | 0.07 |
| 9. | $Zr_{0.8}Ti_{0.2}(Fe_{0.7}V_{0.2}Cr_{0.1})_2$ | 45 | 1.0 | 0.08 |
| 10. | $Zr_{0.7}Ti_{0.2}Nb_{0.1}(Fe_{0.75}V_{0.15}Cr_{0.1})_2$ | 44 | 0.48 | 0.08 |
| 11. | $Zr_{0.8}Ti_{0.2}(Fe_{0.75}V_{0.25})_2$ | 51 | 3.9 | 0.12 |
| 12. | $Zr_{0.8}Ti_{0.2}(Fe_{0.75}V_{0.15}Cr_{0.1})_2$ | 50 | 1.3 | 0.21 |
| 13. | $Zr_{0.7}Ti_{0.2}Nb_{0.1}(Fe_{0.75}V_{0.15}Cr_{0.1})_2$ | 42 | 1.1 | 0.13 |
| Comparative | | | | |
| 14. | $Zr(Fe_{0.75}V_{0.25})_2$ | 44 | No plateau | 0.14 |
| 15. | $MmNi_{4.5}Al_{0.5}$ | 23 | 0.82 | 0.30 |
| 16. | $Zr(Fe_{0.75}V_{0.25})_2$ | 47 | 4.5 | 0.14 |

(Note)
[1] The equilibrium hydrogen dissociation pressure is represented by a pressure at the central point of the release plateau region in the pressure-composition isothermal diagram. Where there is no plateau region (No. 14), it is represented by an equilibrium dissociation pressure at the central point of the maximum hydrogen absorbing capacity.
[2] The maximum hydrogen absorbing capacity is represented by an amount, in ml, of hydrogen at 0° C. under atmospheric pressure per gram of an alloy, into which the hydrogen absorbing capacity corresponding to an equilibrium absorption pressure of 30 atm is converted.
[3] The effective hydrogen releasing capacity is represented by an amount, in ml, of hydrogen at 0° C. under atmospheric pressure per gram of an alloy, into which the amount of hydrogen released between the equilibrium dissociation pressures of 1 and 30 atm is converted.
[4] $P_d$: release plateau pressure (atm), H/M: hydrogen/alloy ratio in the number of atoms.
[5] $P_1$: equilibrium hydrogen dissociation pressure as defined in 1 above, $P_2$: absorption plateau pressure of the same composition that is concerned with $P_1$.
[6] A considerable increase in amounts of hydrogen absorption and release can be expected when the pressure area is expanded up to 30 atm or more.

Each button-shaped sample was placed in a quartz tube, and kept at 1,100° C. under a vacuum of $10^{-2}$ Torr for 8 hours in a heating furnace by using a rotary vacuum pump. Thereafter the sample was thrown into water of room temperatures to effect quenching. Thus the heat treatment for homogenization was effected. The homogenized sample was pulverized into −100 mesh particles.

The activation of the alloy and the method of measuring the amounts of hydrogen absorption and release will now be described with reference to a block diagram as shown in FIG. 1.

15 g of a hydrogen absorbing alloy sample 12 pulverized as described above is contained in a stainless hydrogen absorption and release reactor 10, which is connected with a reservoir 16 via a valve 14. The reservoir 16 is connected with a hydrogen cylinder 20 via a valve 18 and with a rotary vacuum pump 24 via a valve 22. A pressure converter 26 and a digital pressure indicator 28 are provided between the valve 14 and the reservoir 16.

The reactor 10 is communicated with a vacuum pumps 24, and evacuation of the sample is effected at 40° C. under a vacuum of $10^{-2}$ Torr. Subsequently, while the reactor 10 is being cooled with water of room temperatures, a hydrogen gas having a purity of 99.999% and a pressure of 40 atm is introduced into the reactor to start absorption of hydrogen. After the absorption of hydrogen has been substantially completed, vacuum evacuation is effected at 40° C. again. The procedure of pressurizing the sample with hydrogen while cooling with water of room temperatures is repeated till the activation is completed.

The amount of hydrogen absorption or release is measured according to the following procedure.

The reactor 10 is kept at 40° C., and the vacuum pumps 24 is run. The valves 14 and 22 are opened to evacuate the reservoir 16 and the reactor 10. Thereafter, the valves 14 and 22 are closed. The valve 18 is opened to introduce hydrogen of several atm into the reservoir 16, followed by closure of the valve 18. The pressure $P_{t1}$ and temperature $T_1K$ of the atmosphere in the reservoir are measured. Subsequently, the valve 14 is opened to introduce hydrogen in the reservoir 16 into the reactor 10. The pressure $P_{e1}$, which is an equilibrium pressure attained by hydrogen absorption of the sample, is measured. The valve 14 is closed and the valve 18 is opened to increase the hydrogen pressure in the reservoir 16 by several atm, followed by closure of the valve 18. The pressure $P_{t2}$ and temperature $T_2$ of the atmosphere in the reservoir are measured. The valve 14 is opened to introduce new hydrogen into the reactor 10. The pressure $P_{e2}$, which is an equilibrium pressure attained by further hydrogen absorption of the sample, is measured. The above-mentioned procedure is repeated till the pressure $P_{tn}$ (n: the number of times of repetition) reaches about 40 atm. The amount of hydrogen absorption in the n-th run is calculated according to the following procedure.

When the pressure is P, the volume V, the absolute temperature of hydrogen gas T, the molar amount of the hydrogen gas H, the gas constant R, the correction coefficient for adaptation of an ideal gas to an actual hydrogen gas (function of pressure and temperature) Z, there is a relationship represented by the formula PV=HZRT. Utilizing this relationsnip, the amount of hydrogen adsorption in the n-th run can be calculated from the hydrogen pressures $P_{tn}$ and $P_{en}$ in the reservoir, the hydrogen pressures $P_e$ (n−1) and $P_{en}$ in the reactor, the atmospheric temperatures $T_n$ and T (n+1) at the times of respective measurements, and the temperature $T_r$ (313 K) of the reactor.

The molar amount Hn of the hydrogen gas present in the reactor 14 (volume of internal space: $V_1$) and the reservoir 16 (capacity: $V_2$) under a pressure of $P_{tn}$ introduced into the reservoir 16 is represented by the following equation (1):

$$Hn = \frac{1}{R} \cdot \left( \frac{P_{e(n-1)} \cdot V_1}{Z(P_{e(n-1)}, T_r) \cdot T_r} + \frac{P_{tn} \cdot V_2}{Z(P_{tn}, T_n) \cdot T_n} \right) \quad (1)$$

When the valve 14 is opened and the alloy sample 12 is allowed to further aosorb ΔH mol of hydrogen (converted into a molar amount of H₂ molecules) to an equilibrium pressure $P_{en}$, the above-mentioned molar amount $H_n$ of hydrogen present in the reactor 10 and the reservoir 16 is accordance with the folowing equation (2):

$$Hn = \tag{2}$$

$$\frac{P_{en}}{R} \cdot \left( \frac{V_1}{Z(P_{en}, T_r) \cdot T_r} + \frac{V_2}{Z(P_{en}, T_{(n+1)}) \cdot T_{(n+1)}} \right) + \Delta Hn$$

Accordingly, when the equations (1) and (2) are put together, the molar amount ΔH of hydrogen absorbed in the alloy sample in the n-th run is calculated according to the following equation (3):

$$\Delta Hn = \frac{1}{R} \cdot \tag{3}$$

$$\left\{ \left( \frac{P_{tn}}{Z(P_{tn}, T_n) \cdot T_n} - \frac{P_{en}}{Z(P_{en}, T_{(n+1)}) \cdot T_{(n+1)}} \right) \cdot V_2 - \left( \frac{P_{en}}{Z(P_{en}, T_r)} - \frac{P_{e(n-1)}}{Z(P_{e(n-1)}, T_r)} \right) \cdot \frac{V_1}{T_r} \right\}$$

The amount of hydrogen absorbed in each run is calculated according to the equation (3), and a relationship between the equilibrium hydrogen pressure and the amount of hydrogen absorption can be obtained.

The measurement of the amount of hydrogen release is started when an equilibrium hydrogen pressure of about 40 atm is attained in the reservoir 16 and the reactor 10. The valve 14 is closed and the valve 22 is opened to reduce the hydrogen pressure in the reservoir 16 by several atm, followed by closure of the valve 22. The pressure and the atmospheric temperature are measured. Subsequently, the valve 14 is opened to introduce hydrogen in the reactor 10 into the reservoir 16, and part of hydrogen absorbed in the alloy sample 12 is released till an equilibrium is attained. The equilibrium pressure is measured. The procedure as described above is repeated till the reactor 10 is evacuated to vacuum. The amount of hydrogen release is calculated pursuant to the foregoing calculation method for the amount of hydrogen absorption. A relationship between the equilibrium hydrogen pressure and the amount of hydrogen release of the alloy in the case of hydrogen release can be obtained.

Figure 2:
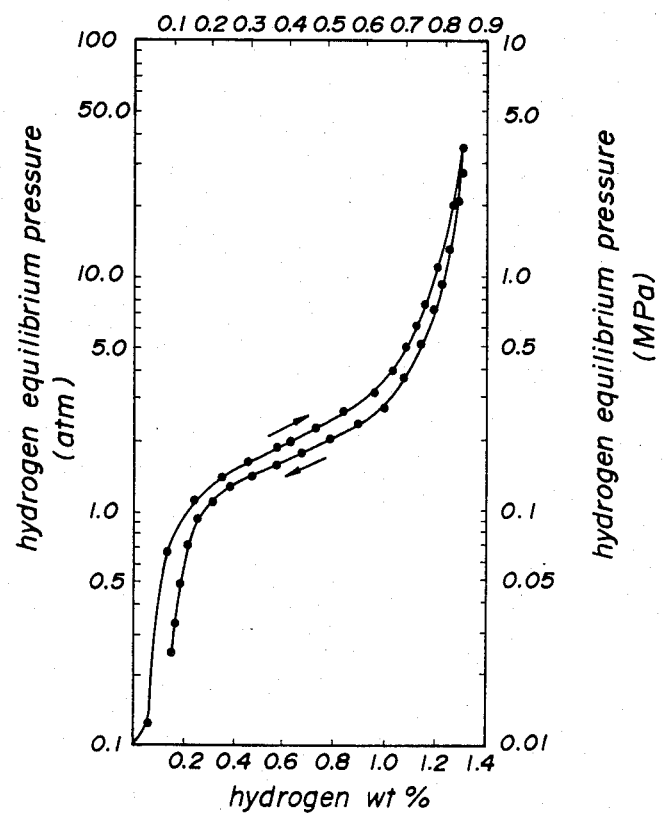
FIGS. 2 and 3 are respective isothermal diagrams each showing a relationship between the equilibrium hydrogen pressure and the composition with respect to embodiments of the alloy of this invention.
Figure 3:
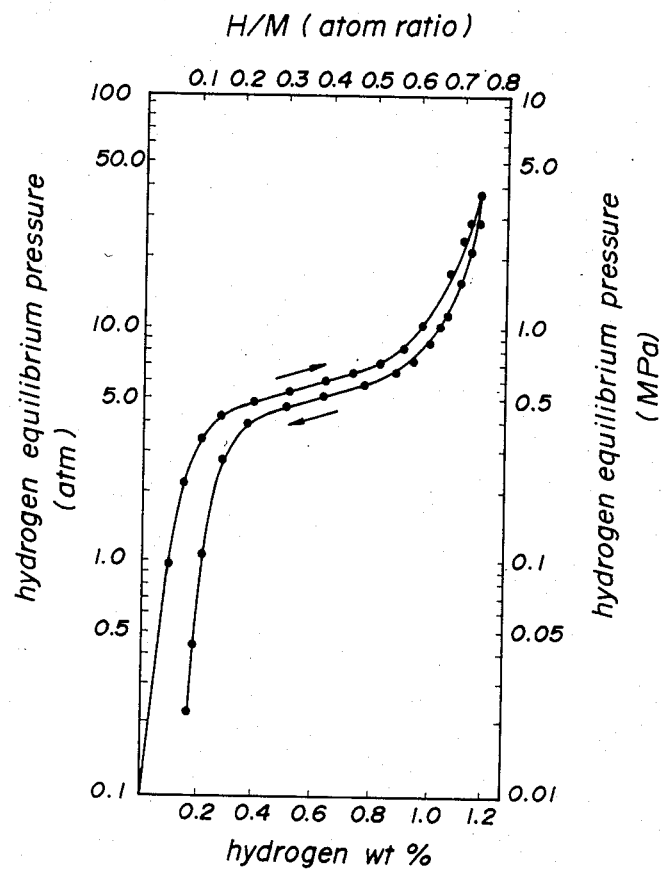

In the way as described above, an isothermal relationship between the equilibrium hydrogen pressure and the composition was found to be as shown in Table 1 with respect to each of the samples Nos. 1 to 7, 14, and 15. The samples Nos. 14 and 15 mentioned in the Table are materials of known compositions. The P-C-T diagrams of the samples Nos. 1 and 2 are exemplefied in FIGS. 2 and 3, respectively.

The sample No. 14, which is a comparative known composition material shown in Table 1, had a high maximum hydrogen absorbing capacity but no plateau region and an equilibrium hydrogen dissociation pressure as very low as 1 atm or below. Accordingly, the amount of hydrogen release between the pressures of 1 atm and 30 atm, namely the effective hydrogen releasing capacity was extremely small. Thus it is not a material suitable as a hydrogen absorbing alloy. In view of the above, the sample No. 15, which has one of the representative compositions of Misch metal alloys being widely known and now tentatively employed in systems such as hydrogen storage apparatuses and heat pumps, was chosen as a comparative material.

The following facts have been disclosed in a comparison of the alloy samples Nos. 1 to 7 according to the present invention with the known material sample No. 15.

(1) Every alloy material according to the present invention has a plateau region and an equilibrium hydrogen dissociation pressure of 1 to 5 atm.

(2) Every sample according to the present invention has substantially an equal or superior level of maximum hydrogen absorbing capacity to that of the known material. As for the effective hydrogen releasing capacity, the samples Nos. 1 to 3 are equal or superior to the known material.

(3) Every sample according to the present invention has a far higher rate of hydrogen absorption than that of the known material.

(4) Every sample according to the present invention but the sample No. 7 has a far smaller hysteresis factor than that of the known material.

(5) Every sample according to the present invention but the sample No. 7 has a slightly steeper inclination of the plateau than that of the known material. The sample No. 7 has a considerably steep inclination.

(6) The activation of every sample according to the present invention can be effected by the single procedure, and is comparably easy to or easier than that of the known material.

(7) The samples Nos. 1 to 3, which were prepared by substituting Ti or Nb for part of Zr, or Cr for part of V, have proved to be very excellent materials which were superior in all the above-mentioned features but the inclination of the plateau to the known material No. 15.

EXAMPLE 2

The alloy material samples Nos. 8 to 13 according to the present invention and the comparative known material No. 16 as shown in Table 1 were subjected to the following experiments. The samples Nos. 8 and 12 have the same composition as that of the sample No. 1. The samples Nos. 10 and 13 have the same composition as that of the sample No. 2. The sample No. 16 has the same composition as that of the sample No. 14. The samples Nos. 9 and 11 have new compositions.

These samples were prepared by using the same materials and the same method as described in formed into a button Example 1, shape after melting, heat-treated for homogenization and pulverized into −100 mesh particles.

The vacuum evacuation temperature for activation of the samples was 80° C. In measuring the amounts of hydrogen absorption and release, the reactor containing the sample was kept at 80° C. in the cases of the samples Nos. 8 to 11 and 16, and at 20° C. in the cases of the samples 12 and 13. Other conditions of the activation and the measurement of the amounts of hydrogen absorption and release were the same as in Example 1.

Even though the measurement temperature for the comparative known material sample No. 16 as shown in Table 1 was elevated to 80° to raise the equilibrium hydrogen dissociation pressure in comparison with that of the sample No. 14 having the same composition as that of the sample No. 16, the equilibrium hydrogen dissociation pressure was 1 atm or less. The hysteresis factor, the rate of hydrogen absorption and the maximum hydrogen absorbing capacity of the sample No. 16 were of relatively good values. However, it was found that the sample No. 16 had a steep inclination of the plateau and a small effective hydrogen releasing capacity, and hence it is not a suitable material as a hydrogen absorbing alloy.

Table 1 demonstrates the following facts in a comparison of the samples Nos. 8 to 11 with the comparative material No. 16 at the measurement temperature of 80° C.

(1) The euilibrium hydrogen dissociation pressures of the samples Nos. 8 to 11 are in a range of 1 to 17 atm.

(2) Every one of the samples Nos. 8 to 11 has a plateau region, a far slighter inclination of the plateau than that of the comparative material No. 16, and a small hysteresis.

(3) The maximum hydrogen absorbing capacities of the samples Nos. 8 to 11 are comparable or superior to that of the comparative sample No. 16, while the hydrogen releasing capacities thereof are superior to that of the comparative sample No. 16, while the hydrogen releasing capacities thereof are superior to that of the comparative sample No. 16.

(4) The samples Nos. 8 to 11 has substantially the same high rate of hydrogen absorption as that of the sample No. 16.

(5) The activation of the samples Nos. 8 to 11 are equally easy or easier as compared with the sample No. 16.

Table 1 demonstrates the following facts with respect to the samples Nos. 12 and 13 at a measurement temperature of 20° C.

Of course, the equilibrium hydrogen dissociation pressures of the samples Nos. 12 and 13 are slightly lower than those of the sampels Nos. 1 and 2 having the same composition which were measured at a temperature of 40° C., while the maximum hydrogen absorbing capacities thereof are of an increased value around 150 ml/g of an alloy. As to the effective hydrogen releasing capacity, the rate of hydrogen absorption, the inclination of the plateau, and the hysteresis, the samples Nos. 12 and 13 are comparable to the samples Nos. 1 and 2. Thus the excellence of these alloys as to these features was confirmed.

The heat of dissociation of metal hydrides of the sample No. 1 (having the same composition as those of the samples Nos. 8 and 12) and that of the sample No. 2 (having the same composition as those of the samples Nos. 10 and 13) were measured and found to be 8.2 and 6.0 Kcal/mol of $H_2$, respectively, which was endothermic.

EXAMPLE 3

A button-shaped sample No. 12 [$Zr_{0.8}Ti_{0.2}(Fe_{0.75}V_{0.15}Cr_{0.1})_2$] was inserted into a quartz tube, and kept at 1,100° C. for 8 hours in a heating furnace evacuated by a rotary pump at a vacuum of $10^{-2}$ Torr. The quartz tube still containing the sample was then put into water to thereby quench the same. Thus the homogenization heating treatment was effected. Subsequently, the alloy was pulverized into particles of about 100 μm in size. The surfaces of the alloy particles thus formed were activated with hydrochloric acid, and then subjected to electroless plating with a Pd salt to cover them with thin Pd films having a thickness of about 100 to 1,000 Å, followed by water washing, alcohol washing, and drying.

15 g of the resulting material was weighed and encapsulated in a stainless hydrogen absorbing and releasing reactor. The closed reactor was evacuated at a temperature of 170° C. to effect degassing. Thereafter, hydrogen of 99.999% in purity was introduced into the closed reactor and pressurized at 30 Kg/cm$^2$. The hydrogen absorption reaction was immediately initiated at room temperature. After hydrogen absorption was sufficiently effected, evacuation of the reactor was carried out again. The activation of the material was substantially completely effected by a single hydrogen absorption and release treatment. The closed reactor was immersed in a temperature-controlled bath kept at a constant temperature. Hydrogen containing 1,000 ppm of moisture was introduced into the reactor, and pressurized at 1 to 30 Kg/cm$^2$. Thus, the amounts of hydrogen introduced and the variation of pressure were measured. The hydrogen absorbing capacity and a difference between the absorption pressure and the release pressure, namely a hysteresis, were determined from an isothermal diagram of pressure-composition prepared based on the above-mentioned measurement. The results are shown under the sample No. 12-1 in Table 2.

As is apparent from Table 2, the material according to the present invention has a high hydrogen absorbing capacity and a largely improved hysteresis as compared with the material No. Ti-1 prepared by subjecting a TiFe alloy to the same treatment as described above.

EXAMPLE 4

A button-shaped hydrogen absorbing alloy of the sample No. 12 was prepared, subjected to the homogenization heating treatment, and pulverized into particles, of about 100 μm in the same manner as in Example 3. The surfaces of the alloy particles thus prepared were subjected to Pd deposition in vacuo ($10^{-4}$ Torr) to be covered with thin Pd films. The alloy particles were stirred. The deposition and stirring were respectively repeated about 10 times to cover the particles with thin Pd films having a thickness of about 100 to 1,000 Å.

15 g of the resulting material was weighed and contained in a stainless hydrogen absorption and release reactor. The closed reactor was operated in the same manner as in Example 3 to effect activation. The activation of the material was substantially completely effected by a single hydrogen absorption and release treatment. The closed reactor was immersed in a temperature-controlled bath kept at a constant temperature. Hydrogen containing 0.1% of moisture, 0.1% of $O_2$ and 1% of $CO_2$ was introduced and pressurized at 1 to 30 Kg/cm$^2$. Thus, the amounts of hydrogen introduced and the variation of pressure were measured. The hydrogen absorbing capacity and a difference between the absorption pressure and the release pressure, namely a hysteresis, were determined from an isothermal diagram of pressure-composition prepared based on the above-mentioned measurement. The results are shown under the sample No. 12-2 in Table 2.

As is apparent from Table 2, the material according to the present invention has a high hydrogen absorbing capacity and a largely improved hysteresis as compared with the material No. Ti-2 prepared by subjecting a TiFe alloy to the same treatment as described above.

TABLE 2

| Kind of material | Sample No. | Covering metal | Alloy composition (Ratio of the number of atoms) | Temperature (°C.) | Hydrogen absorbing capacity (wt. %) | Hydrogen absorption pressure (atm) | Hydrogen release pressure (atm) | Hysteresis (atm) |
| --- | --- | --- | --- | --- | --- | --- | --- | --- |
| Material of this invention | 12-1 | pd | $Zr_{0.8}Ti_{0.2}(Fe_{0.75}V_{0.15}Cr_{0.1})_2$ | 40 | 1.3 | 1.7 | 1.5 | 0.2 |
| Conventional material | Ti-1 | Pd | TiFe | 40 | 0.7 | 15.0 | 7.0 | 8.0 |
| Material of this invention | 12-2 | Pd | $Zr_{0.8}Ti_{0.2}(Fe_{0.75}V_{0.15}Cr_{0.1})_2$ | 40 | 1.2 | 1.9 | 1.7 | 0.2 |
| Conventional material | Ti-2 | Pd | TiFe | 40 | 0.6 | 16.0 | 8.0 | 8.0 |
| Material of this invention | 12-3 | Cu | $Zr_{0.8}Ti_{0.2}(Fe_{0.75}V_{0.15}Cr_{0.1})_2$ | 40 | 1.2 | 2.0 | 1.5 | 0.5 |
| Conventional material | Ti-3 | Cu | TiFe | 40 | 0.6 | 17.0 | 8.0 | 9.0 |
| Material of this invention | 12-4 | Ni | $Zr_{0.8}Ti_{0.2}(Fe_{0.75}V_{0.15}Cr_{0.1})_2$ | 40 | 1.2 | 2.5 | 2.0 | 0.5 |
| Conventional material | Ti-4 | Ni | TiFe | 40 | 0.6 | 17.0 | 8.5 | 8.5 |

EXAMPLE 5

A button-shaped hydrogen absorbing alloy of the sample No. 12 was prepared, subjected to the homogenization treatment, and pulverized into particles of about 100 μm in size in the same mannor as in Example 3. The surfaces of the alloy particles were activated with hydrochloric acid, and subjected to electroless plating with copper chloride to be covered with thin Cu films having a thickness of about 100 to 1,000 Å, followed by water washing, alcohol washing and drying.

15 g of the resulting material was weighed and contained in a stainless hydrogen absorption and released reactor. The closed reactor was operated in the same manner as in Example 3 to effect activation of the material. The activation of the material, was substantially completely effected by a single hydrogen absorption and release treatment. The closed reactor was immersed in a temperature-controlled bath kept at a constant temperature. Hydrogen containing 0.1% of moisture was introduced into the reactor, and pressurized at 1 to 30 Kg/cm². The amounts of hydrogen introduced and the variation of pressure were measured. The hydrogen absorbing capacity and a difference between the absorption pressure and the release pressure, namely a hysteresis, were found from an isothermal diagram of pressure-composition prepared based on the above-mentioned measurement. The results are shown under the sample No. 12-3 in Table 2.

As is apparent from Table 2, the material according to the present invention has a high hydrogen absorbing capacity and a largely improved hysteresis as compared with the material No. Ti-3 prepared by subjecting the conventional material TiFe to the same treatment as described above.

EXAMPLE 6

A button-shaped hydrogen absorbing alloy of the sample No. 12 was prepared, subjected to the homogenization heating treatment, and pulverized into particles of about 100 μm in the same manner as in Example 3. The surfaces of the alloy particles thus prepared were activated with hydrochloric acid, and subjected to electroless plating with nickel chloride to be covered with thin Ni films having a thickness of about 100 to 1,000 Å, followed by water washing, alcohol washing and drying.

15 g of the resulting material was weighed and contained in a stainless hydrogen absorption and release reactor. The closed reactor was operated in the same manner as in Example 3 to effect activation of the material. The activation of the material was substantially completely effected by a single hydrogen absorption and release treatment. The closed reactor was immersed in a temperature-controlled bath kept at a constant temperature. Hydrogen containing 0.1% of moisture was introduced into the reactor, and pressurized at 1 to 30 kg/cm². The amounts of hydrogen introduced and the variation of pressure were meaured. The hydrogen absorbing capacity and a difference between the absorption pressure and the release pressure, namely a hysteresis, were found from an isothermal diagram of pressure-composition prepared based on the above-mentioned measurement. The results are shown under the sample No. 12-4 in Table 2.

As is apparent from Table 2, the material according to the present invention has a high hydrogen absorbing capacity and a largely improved hysteresis as compared with the material No. Ti-4 prepared by subjecting the conventional material TiFe to the same treatment as described above.

The alloy according to the present invention has the foregoing various characteristic features. Therefore, use of the alloy of this invention can provide the following effects.

(1) Every alloy according to the present invention has a plateau region of equilibrium hydrogen pressure. The hydrogen dissociation pressure of it is in the range of 0.6 to 3 atm at 20° C., 1 to 5 atm at 40° C., and 1 to 17 atm at 80° C. The equilibrium hydrogen pressure can be changed in a range of less than 1 atm to more than 1 atm by changing the compostion of the alloy. Thus it can be arbitrarily adapted to the conditions of indivisual hydrogen storage and the system thereof. Thus the alloy has a wide variety of uses.

(2) The activation can be easily completed by the only one procedure of evacuation in vacuo at room temperature and pressurizing at room temperature under a hydrogen pressure of 30 atm.

(3) The maximum hydrogen absorbing capacity and the effective hydrogen releasing capacity are comparable or superior to those of conventional alloys.

(4) The rates of hydrogen absorption and hydrogen release are very high as compared with those of conventional alloys. This enables the repeated use of the alloy of this invention to be swiftly made. Thus, even if the effective hydrogen absorbing and releasing capacities are low, the overall utilization efficiency is high.

(5) The hysteresis is very small as compared with those of conventional alloys. Therefore, even if the alloy of this invention is repeatedly used, the energy loss is small, and hence the efficiency is high.

(6) The alloy containing Ti alone, or Ti and Nb substituted for part of Zr, or Cr substituted for part of V according to the present invention is superior in all the characteristics as the hydrogen absorbing alloy to conventional alloys, for example, the rate of hydrogen absorption thereof being twice or more those of conventional alloys, the hysteresis thereof being $\frac{1}{2}$ or less those of conventional alloys. The dissociation heat of the hydride of the alloy as mentioned above according to the present invention is about 6 to 8 Kcal/mol $H_2$ which is endothermic.

(7) The zirconium alloy system essentially has a high resistance to gaseous impurities as compared with alloys of the Mg system, the Ti system and the rare-earth element system. Also the alloy of this invention is scarcely affected by impurities such as oxygen, nitrogen, argon, carbon dioxide, etc.

(8) Deterioration of the alloy of this invention itself is not substantially recognized no matter how many times the hydrogen absorption and release may be repeated.

The hydrogen absorbing and releasing material of this invention comprising particles of the alloy according to the present invention covered with one element selected from the group consisting of Pd, Cu and Ni has the abovementioned various characteristic features. Therefore, use of the material can provide the following effects.

(1) Even if absorption and release of hydrogen containing gaseous impurities such as moisture, $O_2$ and $CO_2$ are repeated, deterioration of the material is substantially small. Thus the poisoning resistance to gaseous impurities is excellent.

(2) The hydrogen absorbing capacity is higher than those of conventional alloys.

(3) Since a difference between the absorption pressure and the release pressure, namely a hysteresis, is very small as compared with those of conventional alloys, the hydrogen absorbing capacity and the reaction heat can be effectively utilized.

(4) The activation of the material, which is easy, and the rates of hydrogen absorption and release, which are high, are comparable or superior to those of conventional materials.

As described above, the hydrogen absorbing zirconium alloy and material according to the present invention satisfy all of various performance characteristics required of the hydrogen absorbing material. Particularly, they are largely improved in maximum hydrogen absorbing capacity, the rates of hydrogen absorption and release, and hysteresis, as compared with conventional hydrogen absorbing alloys. The alloy of this invention is very easy to activate, able to absorb a large amount of hydrogen at a high density, completely reversible in the hydrogen absorption and release reaction, and highly resistant to gaseous impurities. Thus it has various advantageous features over conventional alloys. It is particularly to be noted that the material of this invention can absorb a large amount of hydrogen containing gaseous impurties such as moisture, $O_2$ and $CO_2$.

Accordingly, the alloy and material according to the present invention, when used at room temperature to 100° C., can exert superior effects inapplications or uses such as not only a heat pump, a regrnerator and temperature sensor, but also particularly hydrogen storage and transportation, and a hydrogen separation and purification, and gettering system.

We claim:

1. A hydrogen absorbing zirconium alloy represented by the following rational formula of atomic composition: $Zr_x A_y (Fe_{1-k} V_1 Cr_m)_2$, wherein A is at least one element selected from the group consisting of titanium, niobium and molybdenum, $0.4 \leq x \leq 1.0$, $0 < y \leq 0.6$, $k = 1 + m$, $0.2 \leq k \leq 0.3$, $1 > 0$ and $m > 0$.

2. A hydrogen absorbing and releasing granular material excellent in poisoning resistance to gaseous impurities, comprising a hydrogen absorbing zirconium alloy represented by the following rational formula of atomic composition: $Zr_x A_y (Fe_{1-k} V_1 Cr_m)_2$ wherein A is at least one element selected from the group consisting of titanium, niobium and molybdenum, $0.4 \leq x \leq 1.0$, $0 < y \leq 0.6$, $k = 1 + m$, $0.2 \leq k \leq 0.3$, $1 > 0$ and $m > 0$ and thin films of one element selected from the group consisting of palladium, copper and nickel and covering the surfaces of particles of said zirconium hydrogen absorbing alloy.

3. A material as claimed in claim 2, wherein the thickness of said thin films is in the range of 100 to 1,000 Å.

* * * * *